United States Patent [19]

Lee

[11] Patent Number: 5,314,704
[45] Date of Patent: May 24, 1994

[54] DEHYDRATED MEAT PRODUCT PROTECTED AGAINST OXIDATION

[75] Inventor: Eldon C. Lee, New Milford, Conn.

[73] Assignee: Nestec S.A., Vevey, Switzerland

[21] Appl. No.: 637,986

[22] Filed: Jan. 2, 1991

Related U.S. Application Data

[63] Continuation of Ser. No. 367,202, Jun. 16, 1989, abandoned, which is a continuation-in-part of Ser. No. 189,771, May 3, 1988, abandoned.

[51] Int. Cl.$^5$ .............................................. A23L 2/26
[52] U.S. Cl. .................................. 426/534; 426/443; 426/465; 426/533; 426/535; 426/544; 426/546; 426/574; 426/641; 426/646
[58] Field of Search ............... 426/533, 541, 641, 646, 426/465, 574, 534, 544, 546, 443

[56] References Cited

U.S. PATENT DOCUMENTS

| | | | |
|---|---|---|---|
| 2,772,169 | 11/1956 | Hall | 426/533 |
| 2,955,042 | 10/1960 | Firor et al. | 426/641 |
| 3,394,016 | 7/1968 | Bidmead | 426/641 |
| 3,519,437 | 7/1970 | Giacino | 426/533 |
| 3,663,233 | 5/1972 | Keszler | 426/641 |
| 3,690,901 | 9/1972 | Hinkley | 426/641 |
| 3,846,568 | 11/1974 | Liepa et al. | 426/646 |
| 4,016,292 | 4/1977 | Hood | 426/641 |
| 4,057,650 | 11/1977 | Keszler | 426/644 |
| 4,239,785 | 12/1980 | Roth | 426/646 |
| 4,381,316 | 4/1983 | Brotsky et al. | 426/641 |
| 4,384,009 | 5/1983 | Lewis et al. | 426/646 |
| 4,741,915 | 5/1988 | Farr et al. | 426/542 |

FOREIGN PATENT DOCUMENTS 1363209 8/1974 United Kingdom .

OTHER PUBLICATIONS

H. Lingnert. "Antioxidative Maillard Reaction Products. II Products from Sugars and Peptides or Protein Hydrolysates" J. of Food Processing and Preservation 4 (1980) 1973-1981.

H. Lingnert. "Antioxidative Maillard Reaction Products III. Application in Cookies," J. of Food Processing and Preservation. 4 (1980) 219-233.

H. Lingnert "Antioxidative Maillard Reaction Products IV. Application in Sausage" J. of Food Processing and Preservation 4 (1980) 235-246.

H. Lingnert, "Formation of Antioxidative Maillard Reaction Products During Food Processing" (Post 1980).

*Primary Examiner*—Peter Chin
*Attorney, Agent, or Firm*—Vogt & O'Donnell

[57] ABSTRACT

Oxidation of cooked, dehydrated meat is inhibited by incorporating a combination of ascorbic acid and a Maillard meat flavor reaction product prepared from at least one reducing sugar and at least one sulfur-containing amino acid into the meat prior to dehydrating the meat.

17 Claims, No Drawings

DEHYDRATED MEAT PRODUCT PROTECTED AGAINST OXIDATION

CROSS REFERENCE TO RELATED APPLICATIONS

This application is a continuation application of application Ser. No. 07/367,202, filed Jun. 16, 1989, now abandoned, which is a continuation-in-part application of application Ser. No. 07/189,771, filed May 3, 1988, now abandoned.

BACKGROUND OF THE INVENTION

The present invention relates to inhibition of oxidation of a cooked, dehydrated meat product.

In the past, development work for manufacturing dehydrated meat products, particularly for use as garnishes, has been directed to and emphasized the use of reconstituted meat for reasons of quality and consistency. However, owing to food legislation and food regulations in Europe, particularly in Germany, reconstituted meat is not accepted as meat in all cases and thus can create label declaration problems. In addition, owing to consumer preference, there is a growing demand for dehydrated genuine meat pieces, i.e., meat pieces which have not been subjected to disintegration and subsequent reconstitution and reshaping which, therefore, retain the original meat form and structure, but dehydrated genuine meat is very susceptible to lipid oxidation and is difficult to protect with antioxidants and thus has a shorter shelf-life than reconstituted meat. For example, freeze-dried genuine meat tends to become rancid rapidly because of its porous form and texture.

In order to overcome lipid oxidation, various antioxidants have been utilized and proposed. Among such antioxidants are various synthetic antioxidants. However, owing to toxicological and nutritional considerations, only a very few synthetic antioxidants are permitted in food applications, e.g., butylhydroxytoluene (BHT), butylhydroxyanisole (BHA), propyl gallate (PG) and t-butyl hydroquinone (TBHQ), but even these antioxidants now are being examined by regulatory agencies and consumer activists. Thus, that has urged the need to explore for and employ new sources of antioxidant substances, which include various substances including tea, rosemary extract, tocopherol and ascorbyl palmitate, for example.

Ascorbic acid, which long has been utilized for curing meat and for color stabilization of meat, as illustrated, for example, by U.S. Pat. Nos. 2,772,169, 2,955,042, 3,690,901 and 4,016,292 and by Great Britain Patent Specification 1 363 209, also has been utilized as an antioxidant for preserving meat, as illustrated for example, by U.S. Pat. Nos. 2,772,169 and 4,741,915. In my work, however, it was found that ascorbic acid presents certain disadvantages when combined with dehydrated meat, in that, because a reaction takes place between lysine, an essential amino acid found in the meat protein, and oxidized ascorbic acid (dehydroascorbic acid), which results in deamination of the lysine, that reaction causes not only the formation of a red pigment, i.e., 2, 2″-nitrilodi-2 (2‴)-deoxyascorbic acid (NDA), which is desirable in red meat, but also loss of and reduction of the amount of lysine, which is undesirable, and that reaction also tends to produce off-flavors.

Maillard reaction products also have been proposed as being potentially useful as antioxidants, as shown by Lingnert, et al., "ANTIOXIDATIVE MAILLARD REACTION PRODUCTS I. PRODUCTS FROM SUGARS AND FREE AMINO ACIDS", J. Food Processing and Preservation, 4, 161 (1980). As disclosed by Lingnert, Maillard reaction products which are said to be most effective as antioxidants are derived from reactants which include "basic" amino acids, with histidine and arginine being shown to be most effective, and those amino acids and lysine being described as having "considerable antioxidative effect" in a model system of emulgated linoleic acid. Additionally, the Lingnert data lead to the conclusion that cysteine, a reactant utilized commonly to prepare maillard reaction meat flavor products, would not provide satisfactory antioxidant activity.

SUMMARY OF THE INVENTION

It has been discovered that a combination of ascorbic acid, its isomers and salts thereof with Maillard reaction meat flavor products employed in accordance with the present invention impart not only excellent stability against rancidity but also a very pleasant meaty flavor both to cooked, dehydrated genuine meat and cooked, dehydrated reconstituted meat.

Accordingly, the present invention provides a process for the preparation of a cooked, dehydrated meat product in which oxidation is inhibited which comprises incorporating a combination of ascorbic acid selected from a group consisting of L-ascorbic acid and D-isoascorbic acid (erythorbic acid), food-acceptable salts thereof and combinations thereof, and a Maillard reaction meat flavor product prepared from reactants comprising at least one reducing sugar and at least one sulfur-containing amino acid into the meat prior to dehydrating the meat. Preferably, the reactants for preparing the Maillard meat flavor reaction product also include other amino acids and/or mixtures of various amino acids, and/or a source of amino acids, preferably a protein hydrolysate, and in such cases, the reactants preferably also include at least one non-amino acid sulfur-containing compound.

Preferably, the reducing sugar is selected from the group of 5- and 6-member reducing sugars, the pentoses and hexoses, with the pentoses, particularly, arabinose and xylose being most preferred, as it has been found the Maillard reaction proceeds at an optimum rate with these reducing sugars. Preferably, the sulfur-containing amino acids are cysteine and cystine, employed individually or in combination, and a preferred nonamino acid sulfur-containing compound is thiamine.

Also encompassed within the present invention is an antioxidant composition for preserving cooked, dehydrated meat which comprises a combination of ascorbic acid selected from a group consisting of L-ascorbic acid and D-isoascorbic acid, food-acceptable salts thereof and combinations thereof, and a maillard meat flavor reaction product prepared from at least one reducing sugar and at least one sulfur-containing amino acid. As will be appreciated readily by the artisan, the various combinations of elements which may be further included in the combination of the composition are the same as disclosed above in the summary of the process of the present invention and as further disclosed below.

DETAILED DESCRIPTION OF THE INVENTION

The present invention provides for antioxidant compositions which are more potent than ascorbic acid alone and, in view of the Lingnert disclosure, supra, more potent than would be expected from a combination of the elements of the present invention. Moreover, by reason of the present invention, it is believed that the amino acid component of the combination of ascorbic acid and Maillard reaction product of the present invention takes part in a reaction with dehydroascorbic acid which competes with the deamination reaction between lysine and dehydroascorbic acid, thus reducing the amount of lysine deamination and thereby reducing the loss of lysine and the tendency for formation of off-flavors. In addition, it appears that the amino acid-dehydroascorbic acid reaction produces a reaction product which enhances flavor beyond that which would be expected from use of the Maillard reaction product alone. Further, since red pigment formation in dehydrated meat is reduced by this reaction, certain dehydrated meats, such as chicken white meat, for example, will tend to develop less red coloration, thus providing for greater consumer acceptance.

Preparation of Maillard reaction meat flavor products by various means is well known and believed to be well within the skill of one of ordinary skill in the art. Generally, to obtain a Maillard meat flavor reaction product, in addition to the presence of a reducing sugar and a source of amino acids, the presence of a sulfur-containing compound, which may be such as hydrogen sulfide, thiamine, a sulfur-containing amino acid, such as cysteine or cystine or their derivatives, is required for the reaction. The mixture then is subjected to appropriate conditions of temperature and time for effecting the Maillard reaction.

As noted above, in the present invention, the sulfur-containing amino acids cysteine and cystine are preferred as a basic material for providing both sulfur and amino acid components. Likewise, in Maillard reactions and in the present invention, various other amino acids, and mixtures thereof or a source of amino acids, such as protein hydrolysates, may be utilized in the reaction. Particularly in the present invention, it is preferred to include protein hydrolysates in the Maillard reaction mixture with one or more sulfur-containing amino acids for providing what is believed to be optimum results, and in this case, further non-amino acid sulfur-containing compounds, particularly thiamine, advantageously are included in the reaction mixture for obtaining optimum results. As also indicated above, preferably, the reducing sugars utilized are pentose reducing sugars.

For protection of the dehydrated meat from oxidation, the amount of the Maillard reaction meat flavor incorporated into the meat may be from about 0.01%, to about 1.0%, preferably from about 0.025% to about 0.5% and especially from about 0.05% to about 0.25% by weight based on the weight of the meat, and the amount of ascorbic acid incorporated into the meat may be from about 0.01% to about 0.5%, preferably from about 0.02% to about 0.2% and especially from about 0.03% to about 0.1% by weight based on the weight of meat.

When the process of the present invention is applied to genuine meat, various methods may be utilized for incorporating a combination of the ascorbic acid and Maillard reaction product into the meat, and preferably they are provided for incorporation in a form of an aqueous solution. The solution may be incorporated into the meat such as, for example, by directly injecting it into the meat or by marinating the meat in the solution, with marination being preferred. When marinating, the meat is contacted with the solution for a time sufficient for providing effective penetration of the solution into the meat for incorporating the combination of the ascorbic acid and Maillard reaction product into the meat.

For obtaining the desired amounts of the ascorbic acid and maillard meat flavor reaction products in treated meat, it has been found that the amount of ascorbic acid in the aqueous solution may be from about 0.1% to about 10%, preferably from about 0.25% to about 5% and especially from about 0.5% to about 2% by weight based on the weight of the solution. The amount of Maillard reaction meat flavor in the aqueous solution may be from about 0.2% to about 20%, preferably from about 0.5% to about 10% and especially from about 1.0% to about 5.0% by weight based on the weight of the solution. The pH of the solution may be from a pH of from about 5 to about 8 but is preferably a pH of from about 6 to about 7 and most preferably the solution has a pH of about 7. Utilization of a pH below 5 tends to provide a product of poor tenderness while a pH increasing above 7 begins to result in production of off-flavors and tends to affect color negatively.

Advantageously, food-acceptable buffering agents such as bicarbonates, citrates, phosphates, pyrophosphates, polyphosphates, etc., are included in the aqueous solution. Use of sodium bicarbonate is especially desirable since it has been found to impart improved tenderness to the meat. optionally, chelating agents such as mannitol or gluconate may be included in the solution, although such have not been shown to enhance results.

The temperature of the solution and meat when contacting the solution and meat for incorporating the solution into the meat may be any temperature commonly used for marinating meat, e.g., from a refrigeration temperature above 0° C .to a temperature below the denaturation temperature of the meat protein (approximately 55° C.) . Ambient temperatures, e.g., from about 15° C. to about 30° C., are most practical.

When marinating, the amount of solution utilized advantageously is that amount which is sufficient to cover the meat, but if the solution is circulated or agitated for assisting in contacting the meat, which thereby aids in incorporating the solution into the meat, the amount of solution may be reduced. Thus, at least the contacting solution preferably is agitated, preferably by nitrogen bubbling.

When the process of the present invention is applied to genuine meat, before contacting the meat with the combination of ascorbic acid and the Maillard reaction product, the meat advantageously is cut, for example, into pieces having a volume of from about 0.03 cc to about 6.9 cc, preferably from about 0.2 cc to about 2.0 cc, conveniently by dicing. Slices or larger pieces of meat may be marinated, but that may require longer contact times with the solution and may require the use of further equipment, such as vacuum tumblers, for facilitating penetration of the solution into the meat. Thus, injection of the solution into such larger meat pieces may be preferred.

When marinating pieces of meat, as disclosed above, to incorporate the solution containing ascorbic acid and the Maillard meat flavor reaction products into the meat, effective penetration and incorporation of the desired amounts conveniently may be achieved in from about 10 minutes to about 2 hours, more usually from about 20 minutes to about 1 hour. The factors which affect the time of contacting for effective penetration and incorporation of the solution into the meat include the size of the meat pieces, the concentration of the solution, agitation conditions and temperature.

Additionally, when genuine meat is treated, the meat preferably is cooked after being contacted with the ascorbic acid and the maillard reaction meat flavor solution. The cooking may be carried out by any conventional method, for example, by broiling, frying, microwave heating, roasting, or pressure cooking, but preferably, the cooking is by steam cooking, and although boiling water can be utilized to cook the treated meat, as one of ordinary skill will recognize, there is a greater potential for leaching out the antioxidant composition of the present invention.

When the process of the present invention is applied to reconstituted meat, the ascorbic acid and the Maillard reaction meat flavor product preferably are in the form of a dry mix and are blended directly with the disintegrated meat prior to reconstitution and shaping. That is, it is not necessary to place the mix in aqueous solution to achieve effective incorporation because of the nature of the reconstituted meat. Thus, although an aqueous solution may be used for reconstituted meat, there is no advantage obtained thereby. That is, when a solution is used, additional processing steps may be required for removing and recovering any excess marination solution and unnecessary moisture will need to be removed when the meat is dehydrated.

Advantageously, binders such as soy protein, milk protein, egg albumin, or wheat gluten may be added to the reconstituted meat, preferably after treatment, as they may help to bind fat and moisture and to retain the granules of reconstituted meat intact.

When treating reconstituted meat, cooking of the meat may be carried out prior to grinding, prior to reconstitution or after reconstitution. The cooking may be carried out before or after contacting and incorporating ascorbic acid and the Maillard reaction product into the meat, and it may be carried out by any conventional method, as with the genuine meat.

Finally, in either the case of treated genuine or reconstituted meat, the treated, cooked meat is dried preferably to a moisture content of from about 1% to about 5% by any conventional method. Genuine meat is advantageously dried by freeze-drying. Reconstituted meat may be dried advantageously such as by fluidized bed drying.

The cooked, dehydrated, treated meat may be packed in air, but preferably is packed in an inert atmosphere, such as with nitrogen or carbon dioxide, or packed under vacuum conditions with oxygen impermeable packing materials. The process of the invention is applicable to all kinds of meats, and particularly for beef, pork, turkey, chicken and seafoods. The process is particularly suitable for meats which are to be used as garnishes.

EXAMPLES

The following Examples illustrate the present invention.

EXAMPLE 1

100 parts of beef shoulder are semi-frozen, sliced and then diced into cubes of 0.6 cc and marinated in 100 parts of an aqueous solution containing 1 part of ascorbic acid, 3 parts of a maillard reaction meat flavor, prepared by reacting protein hydrolysate, cysteine and thiamine with reducing sugars, and 1 part of sodium bicarbonate at pH 7 with constant agitation by nitrogen bubbling at ambient temperature for 30 minutes.

The marinated cubes are drained, placed in a steamer and steamed with constant agitation until well done, and then cooled in a freezer. The meat then is placed in a freeze dryer and refrigerated at $-25°$ C. for 2 hours prior to commencing the dehydration process. The conditions for dehydration are as follows:

| drying plate temperature | 60° C. |
|---|---|
| pressure | 400 millitorrs |
| condenser temperature | $-40°$ C. |
| maximum temperature of product | 50° C. |

The moisture content of the dried meat is 2%.

The freeze dried meat is afterwards packed in 150 ml aluminum cans (each containing about 24.2 g meat) in nitrogen by vacuuming the chamber down to 710 mm Hg then flushing nitrogen back before sealing.

The ethane production in the headspace is measured by gas chromatographic analysis after 18 months storage at 20° C. is about 0.6 ppm. This indicates excellent storage stability.

EXAMPLE 2

A procedure similar to that described in Example 1 is followed except that, instead of sodium bicarbonate, a similar quantity of trisodium pyrophosphate is used. The ethane production in the headspace after 18 months storage at 20° C. is about 0.8 ppm indicating excellent storage stability.

COMPARATIVE EXAMPLE A

A procedure similar to that described in Examples 1 and 2 is followed but without the marination treatment. The ethane production in the headspace after 18 months storage at 20° C. is about 3.1 ppm which indicates significantly poorer storage stability to that of the meat products of Examples 1 and 2.

COMPARATIVE EXAMPLE B

A procedure similar to that described in Example 1 is followed but without the marination treatment and except that the beef is packed in air instead of nitrogen. The ethane production in the headspace after 18 months storage at 20° C. is about 6.0 ppm.

EXAMPLE 3

A procedure similar to that described in Example 1 is followed with the marination treatment except that the beef is packed in air instead of nitrogen. The ethane in the headspace after 18 months storage at 20° C. is about 2.4 ppm which indicates an improvement of significance and good stability as compared with the product of Comparative Example B.

COMPARATIVE EXAMPLE C

A procedure similar to that described in Example 1 is followed with incorporation of ascorbic acid by marination but without the incorporation of the Maillard meat flavor reaction product. One sample of the treated beef is packed in nitrogen and the other in air. The ethane production in the headspace of the beef packed in nitrogen after 18 months is about 0.6 ppm, and the ethane production of the beef packed in air after 18 months is about 3.1 ppm which demonstrates the improvement provided by the combination of ascorbic acid and the Maillard meat flavor reaction product of the present invention. See Example 3.

EXAMPLE 4

A procedure similar to that described in Example 1 is followed but using pork instead of beef. The ethane production in the headspace after 6 months storage at 37° C. is about 2.2 ppm which indicates excellent storage stability.

COMPARATIVE EXAMPLE D

A procedure similar to that described in Example 4 is followed but without the marination treatment. The ethane production in the headspace after 6 months storage at 37° C. is about 8.4 ppm which is significantly poorer than that of the product of Example 4.

EXAMPLE 5

A procedure similar to that described in Example 4 is followed except that the pork is packed in air instead of nitrogen. The ethane production in the headspace after 6 months of storage at 37° C. is about 3.8 ppm which indicates very good storage stability.

COMPARATIVE EXAMPLE E

In a similar procedure to that described in Example 5 but without the marination treatment, the ethane production in the headspace after 6 months storage at 37° C. is about 22.2 ppm which is significantly inferior to that of the product of Example 5.

EXAMPLE 6

75 parts of precooked ground beef, 20 parts of soy protein and 5 parts of fresh egg white are mixed and blended with 0.05 parts of ascorbic acid and 0.15 parts of a Maillard reaction meat flavor prepared by reacting protein hydrolysate, cysteine and thiamine with reducing sugar, then extruded and granulated to cylindrical pellets with a diameter of 0.5 cm and a length of 1 cm. The granulated reconstituted meat is dehydrated by using a fluidized bed dryer in which the drying cycles are:

1) 100° C. for 30 minutes,
2) 70° C. for 60 minutes and
3) 60° C. for 60 minutes.

The fluidized bed dryer is preheated to the desired temperature prior to meat introduction and the product is dried to a moisture content below 3%. The dehydrated meat is afterwards packed with oxygen-impermeable packing materials in nitrogen. The product showed good storage stability.

From the foregoing, it will be apparent to one of ordinary skill that various combinations of elements may be utilized for practicing the present invention without departing from the spirit and scope of the invention as defined by the following claims.

I claim:

1. A process for inhibiting oxidation of cooked, dehydrated meat comprising incorporating compositions into meat which comprise a combination of (i) ascorbic acid in a form selected from a group of ascorbic acid forms consisting of L-ascorbic acid and D-isoascorbic acid, food acceptable salts thereof and combinations thereof, and (ii) a Maillard meat flavor reaction product prepared from reactants comprising at least one reducing sugar and at least one sulfur-containing amino acid, cooking the meat having the compositions incorporated therein and then dehydrating the cooked meat for obtaining a dehydrated meat.

2. A process for inhibiting oxidation of cooked, dehydrated meat comprising cooking meat, incorporating compositions into the cooked meat which comprise a combination of (i) ascorbic acid in a form selected from a group of ascorbic acid forms consisting of L-ascorbic acid and D-sioascorbic acid, food acceptable salts thereof and combinations thereof, and (ii) a Maillard meat flavor reaction product prepared from reactants comprising at least one reducing sugar and at least one sulfur-containing amino acid, and then dehydrating the cooked meat having the compositions incorporated therein for obtaining a dehydrated meat.

3. A process according to claim 1 or 2 wherein the meat is in a ground, disintegrated form prior to dehydration and further comprising reconstituting and shaping the meat prior to dehydration.

4. A process according to claim 1 or 2 wherein the Maillard reactants further comprise at least one reactant selected from the group of reactants consisting of a protein hydrolysate and a non-amino acid sulfur-containing compound.

5. A process according to claim 1 or 2 wherein the Maillard reactants further comprise thiamine.

6. A process according to claim 1 or 2 wherein he at least one sulfur-containing amino acid is selected from the group of sulfur-containing amino acids consisting of cysteine and cystine and derivatives thereof and combinations thereof.

7. A process according to claim 5 wherein the at least one sulfur-containing amino acid is selected from the group of sulfur-containing amino acids consisting of cysteine and cystine and derivatives thereof and combinations thereof.

8. A process according to claim 1 or 2 wherein the ascorbic acid is incorporated into the meat in an amount of from about 0.01% to about 0.5% by weight based upon the weight of the meat, and the Maillard reaction product is incorporated into the meat in an amount of from about 0.01% to about 1.0% by weight based upon the weight of the meat.

9. A process according to claim 1 or 2 wherein the ascorbic acid and Maillard reaction product are in aqueous solution for being incorporated into the meat.

10. A process according to claim 9 wherein the ascorbic acid and Maillard reaction product are incorporated into the meat by a process selected from the group of incorporation processes consisting of marinating the meat in the solution and injecting the solution into the meat.

11. A process according to claim 9 wherein the ascorbic acid is in the solution in an amount of from about 0.1% to about 10% by weight based upon the weight of the solution, and the Maillard reaction product is in the solution in an amount of from about 0.2% to about 20% by weight based upon the weight of the solution.

12. A process according to claim 9 wherein the pH of the solution is from about 6 to about 7.

13. A process according to claim 9 wherein the solution further comprises sodium bicarbonate.

14. A process according to claim 2 wherein the additives are incorporated as a dry mix into the cooked meat.

15. A process according to claim 1 or 2 wherein the cooked meat is dehydrated to a moisture content of from about 1% to about 5%.

16. A process according to claim 1 or 2 further comprising packing the dehydrated meat in an inert atmosphere.

17. The product of the process of claim 1 or 2.

* * * * *

UNITED STATES PATENT AND TRADEMARK OFFICE
CERTIFICATE OF CORRECTION

PATENT NO. : 5,314,704
DATED : May 24, 1994
INVENTOR(S) : Eldon C. LEE

It is certified that error appears in the above-indentified patent and that said Letters Patent is hereby corrected as shown below:

Column 8, line 15 (line 6 of claim 2), "D-sioascorbis should be --D-isoascorbic--.

Signed and Sealed this

Eleventh Day of October, 1994

Attest:

BRUCE LEHMAN

Attesting Officer

Commissioner of Patents and Trademarks